United States Patent
Kishigami

(10) Patent No.: US 9,712,338 B2
(45) Date of Patent: Jul. 18, 2017

(54) COMMUNICATION SYSTEM

(71) Applicant: DENSO CORPORATION, Kariya, Aichi-pref. (JP)

(72) Inventor: Tomohisa Kishigami, Obu (JP)

(73) Assignee: DENSO CORPORATION, Kariya (JP)

( * ) Notice: Subject to any disclaimer, the term of this patent is extended or adjusted under 35 U.S.C. 154(b) by 35 days.

(21) Appl. No.: 14/287,406

(22) Filed: May 27, 2014

(65) Prior Publication Data
US 2014/0355622 A1    Dec. 4, 2014

(30) Foreign Application Priority Data

May 30, 2013   (JP) .................................. 2013-114453

(51) Int. Cl.
*H04L 12/413*    (2006.01)
*H04L 12/403*    (2006.01)

(52) U.S. Cl.
CPC .......... *H04L 12/413* (2013.01); *H04L 12/403* (2013.01)

(58) Field of Classification Search
None
See application file for complete search history.

(56) References Cited

U.S. PATENT DOCUMENTS

| | | | | |
|---|---|---|---|---|
| 4,907,222 A | * | 3/1990 | Slavik | ....................... H04J 3/06 307/10.1 |
| 5,402,420 A | | 3/1995 | Kobayashi | |
| 5,748,675 A | * | 5/1998 | Hormel | ............... B60R 16/0315 375/219 |
| 5,878,082 A | | 3/1999 | Kishigami | |
| 6,008,733 A | * | 12/1999 | Okano | ................ H02J 13/0044 307/127 |
| 6,031,823 A | | 2/2000 | Hormel et al. | |

(Continued)

FOREIGN PATENT DOCUMENTS

| | | |
|---|---|---|
| JP | H05-211511 A | 8/1993 |
| JP | H09-046357 A | 2/1997 |

(Continued)

OTHER PUBLICATIONS

Office Action mailed May 19, 2015 issued in corresponding JP patent application No. 2013-114453 (and English translation).

*Primary Examiner* — Kwang B Yao
*Assistant Examiner* — Juvena Loo
(74) *Attorney, Agent, or Firm* — Posz Law Group, PLC

(57) ABSTRACT

A communication system is provide which includes a plurality of communication units connected to a communication line, in which collisions occur between dominant signals outputted from the communication units on the communication line. At least one of the communication units includes a first driver which is set so that a variation of voltage applied to the communication line in transmission of the dominant signal with respect to that in absence of transmission of the dominant signal is smaller than a variation of voltage applied from another of the communication units to the communication line in transmission of the dominant signal. One of the communication units, which differs from the communication unit including the first driver, includes a second driver which limits variation per unit time of current flowing through the communication line in transmission of the dominant signal.

6 Claims, 6 Drawing Sheets

(56) References Cited

U.S. PATENT DOCUMENTS

| | | | | |
|---|---|---|---|---|
| 2008/0290444 A1* | 11/2008 | Crawley | ............. | H01L 23/5223 |
| | | | | 257/503 |
| 2008/0301253 A1* | 12/2008 | Ohmi | ....................... | H04B 3/54 |
| | | | | 709/209 |
| 2009/0180497 A1* | 7/2009 | Bidenbach | .............. | H04L 7/044 |
| | | | | 370/503 |
| 2011/0238774 A1* | 9/2011 | Maeda | ..................... | H04B 3/54 |
| | | | | 709/208 |

FOREIGN PATENT DOCUMENTS

| JP | H09-064826 A | 3/1997 |
|---|---|---|
| JP | 2839054 B2 | 12/1998 |

\* cited by examiner

COMMUNICATION SYSTEM

CROSS-REFERENCE TO RELATED APPLICATION

This application is based on and claims the benefit of priority from earlier Japanese Patent Application No. 2013-114453 filed May 30, 2013, the description of which is incorporated herein by reference.

BACKGROUND

Technical Field

The present invention relates to a communication system in which dominant signals from a plurality of communication units connected to a communication line are likely to collide with each other.

Related Art

In a known communication system as disclosed in a patent document JP-B-2839054, for example, a plurality of communication units (hereinafter also referred to as nodes) are connected to a communication line. The plurality of nodes mutually transmits PWM (pulse width modulation) codes, and when transmission signals (dominant signals) collide with each other, the node transmitting a longer dominant pulse is ensured to be superior in arbitration.

In some communication methods, dominant signals outputted from a plurality of nodes are likely to collide with each other. Such communication methods may, for example, be the CSMA/CD (carrier sensor multiple access with collision detection) method as disclosed in the above patent document JP-B-2839054 or a master-slave type communication method in which a slave node performs data transmission in synchronization with the data transmission from a master node.

In the communication system mentioned above, dominant signals are transmitted from a plurality of nodes and may collide with each other. If a node stops transmission of a dominant signal under the condition that dominant signals collide with each other, the voltage outputted from this node to the transmission line may vary, causing drastic variation in the current flowing through the communication line.

For example, let us refer to FIG. 7 illustrating a general configuration of a communication system based on conventional art. This communication system includes a communication line 2, a master node 10 and a slave node 30. The master node 10 and the slave node 30 are connected to the communication line 2 configuring a communication bus. The master node 10 periodically transmits a dominant signal. In synchronization with the periodical transmission of a dominant signal from the master node 10, the slave node 30 switches between transmission and non-transmission of a dominant signal to thereby transmit serial data.

In this communication system, the nodes 10 and 30 include terminal resistors 12 and 32, transmission transistors 14 and 34, and communication circuits 20 and 40, respectively. Each of the terminal resistors 12 and 32 connects a power-supply line applied with a power-supply voltage Vc to the communication line 2. Each of the transmission transistors 14 and 34 connects the communication line 2 to a grounding line to transmit a dominant signal.

The terminal resistor 12 of the master node 10 has a resistance which is set to a value (e.g., 1 kΩ) much smaller than a resistance (e.g., 30 kΩ) of the terminal resistor 32 of the slave node 30.

FIG. 8 is a timing diagram illustrating the operation of this communication system. As shown in FIG. 8, the communication circuit 20 of the master node 10 periodically outputs a drive voltage S1 (high level) to the transistor 14 via a resistor 18. Thus, the transistor 14 is periodically turned on and permitted to transmit a dominant signal (ground potential).

On the other hand, the communication circuit 40 of the slave node 30 monitors voltage variation of the communication line 2 via a comparator 36 to determine whether or not a dominant signal has been outputted from the master node 10.

Upon detection of the output of a dominant signal from the master node 10 (time t1 and only when transmission data has a value 1, the communication circuit 40 turns on the transistor 34 for a predetermined period (from time t2 to time t4) to output a dominant signal (ground potential). In this case, the communication circuit 40 prolongs the low-level period of the communication line 2 more than the low-level period when the transmission data has a value 0.

The communication circuit 20 of the master node 10 monitors voltage variation (High-Low) of the communication line 2 via a comparator 16. Thus, the communication circuit 20 of the master node 10 is able to detect the data transmitted from the slave node 10 on the basis of the duty ratio of High-Low of the communication line 2.

In this way, in the communication system shown in FIG. 7, the slave node 30 synchronizes with a dominant signal from the master node 10 to transmit a dominant signal when the transmission data has a value 1. However, this way of transmission causes collision between dominant signals outputted from the nodes 10 and 30.

When such a collision occurs (time t2), the transmission transistors 14 and 34 are both in a turned-on state. Therefore, no potential difference is caused between the nodes 10 and 30 in the communication line 2 and thus the current flowing through the communication line 2 will become zero.

After that, however, the communication circuit 20 of the master node 10 switches the drive voltage S1 of the transistor 14 to a low level and stops the output of a dominant signal (time t3). Then, current flows from the terminal resistor 12 of the master node 10 to the transistor 34 of the slave node 30 via the communication line 2.

In this case, in terms of the path of current flowing through the terminal resistor 12, the transistor 14 is merely replaced by the transistor 34. Accordingly, the slave node 30 is in a state where the communication line 2 is connected to the grounding line via the transistor 34. Therefore, the slave node 30 is not able to control the current flowing through the communication line 2.

As a result, at time t3 when the transistor 14 of the master node 10 is turned off as mentioned above, the current flowing through the communication line 2 steeply varies and this steep current variation causes large radiation noise.

The radiation noise can be reduced by suppressing the variation per unit time of current (gradient of current shown in FIG. 8) flowing through the communication line 2. However, in the slave node 30, the potential of the communication line 2 is fixed to a potential of a level of outputting a dominant signal (the ground potential here). Therefore, the drive voltage of the transistor 34 cannot be controlled to suppress the current variation, as is done in the switching between output and stop of the dominant signal.

SUMMARY

An embodiment provides a communication system which suppresses generation of radiation noise due to current variation in a communication line. In the communication system, a plurality of nodes are connected to each other via the communication line, and the nodes perform data communication on the basis of a communication method which is likely to cause collision between dominant signals outputted from the nodes.

As an aspect of the embodiment, a communication system is provide which includes a plurality of communication units connected to a communication line, in which collisions occur between dominant signals outputted from the communication units on the communication line. At least one of the communication units includes a first driver which is set so that a variation of voltage applied to the communication line in transmission of the dominant signal with respect to that in absence of transmission of the dominant signal is smaller than a variation of voltage applied from another of the communication units to the communication line in transmission of the dominant signal. One of the communication units, which differs from the communication unit including the first driver, includes a second driver which limits variation per unit time of current flowing through the communication line in transmission of the dominant signal.

DETAILED DESCRIPTION OF THE PREFERRED EMBODIMENTS

With reference to the accompanying drawings, hereinafter are described embodiments of the present invention.

The present invention shall not be construed, being limited by the following embodiments. Further, as far as the problem set forth above is solved, a part of the configuration in the following embodiments may be omitted. This omitted mode shall also be encompassed by the present invention. In addition, any mode that can be conceived within a scope not departing from the essence of the present invention shall also be encompassed by the present invention. The reference symbols used in the description of the following embodiment are also appropriately used in the claims. These reference symbols are used in the claims for easy understanding of the present invention and thus shall not limit the technical scope of the present invention.

Embodiment

Figure 1:
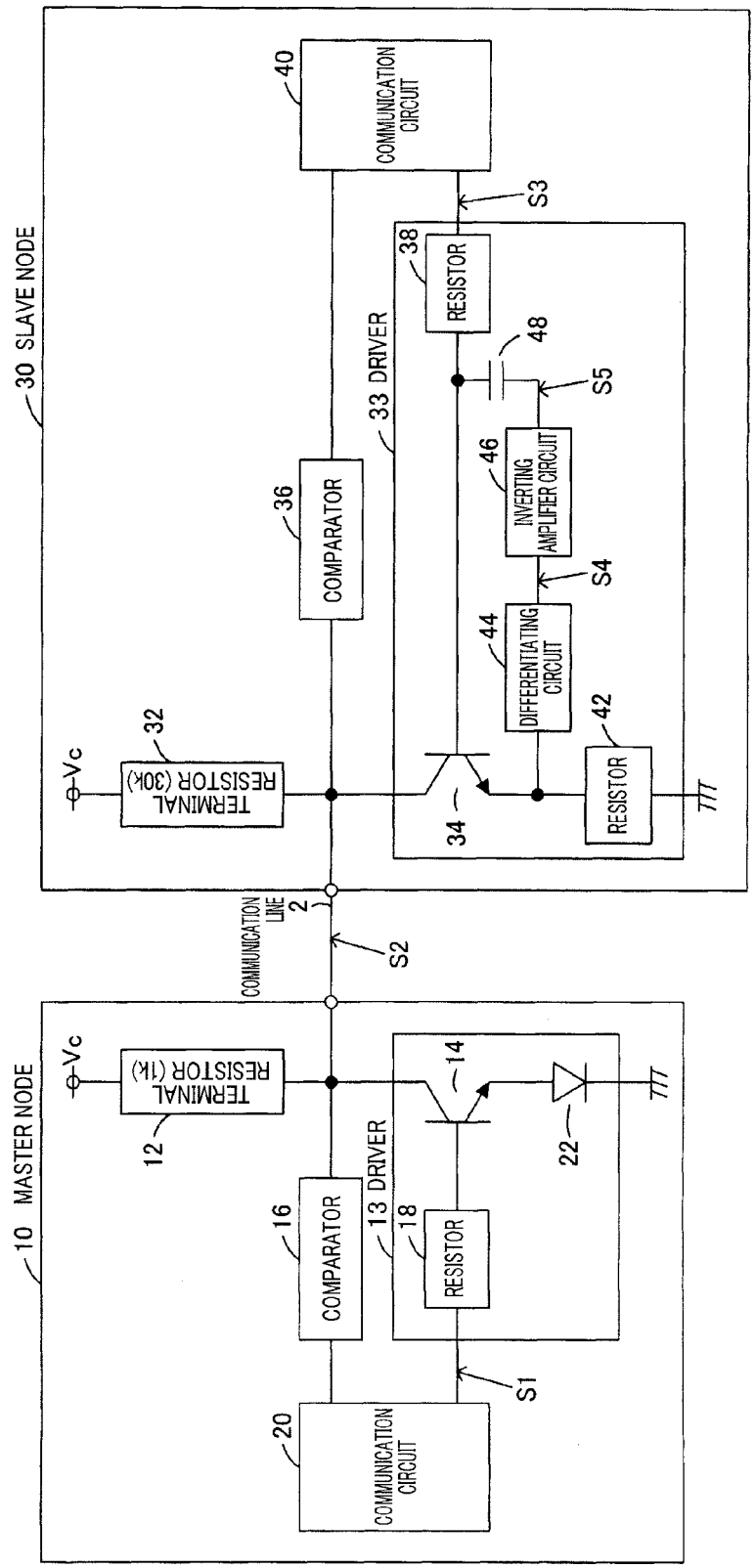
FIG. 1 is a block diagram illustrating a general configuration of a communication system according to an embodiment.

FIG. 1 is a block diagram illustrating a general configuration of a communication system according to the embodiment. As shown in FIG. 1, the communication system of the present embodiment is used in a motorcar and includes a communication line 2, a single master node 10, and one or more slave nodes 30. The communication line 2 is a communication bus wired in the motorcar. The single master node 10 and one or more slave nodes 30 are connected to the communication line 2.

Figure 7:
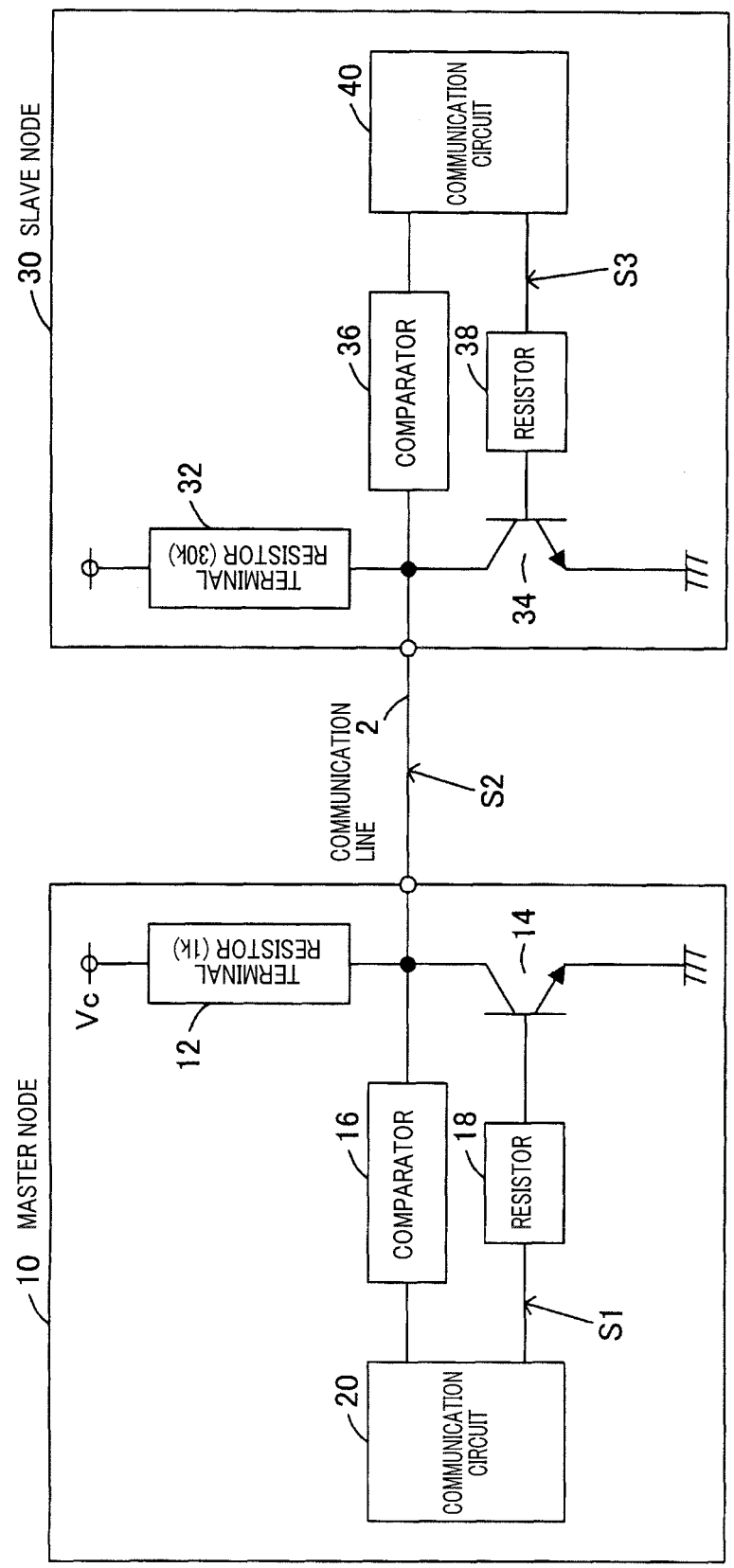
FIG. 7 is a block diagram illustrating a general configuration of a communication system based on a conventional art.
Figure 8:
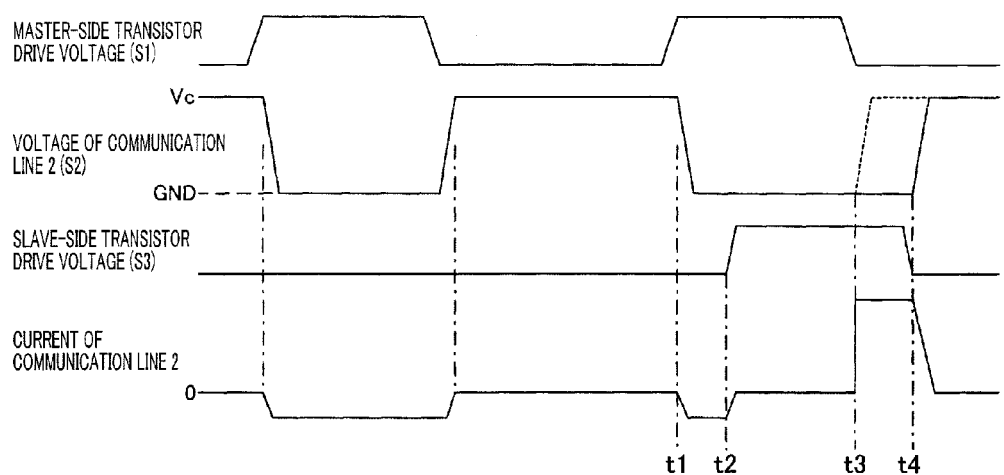
FIG. 8 is a timing diagram illustrating an operation of the communication system based on the conventional art.

Similar to the communication system shown in FIG. 7, the master node 10 and each slave node 30 include terminal resistors 12 and 32, reception comparators 16 and 36, and communication circuits 20 and 40, respectively. Each of the terminal resistors 12 and 32 connects a power-supply line applied with a power-supply voltage Vc to the communication line 2.

The master node 10 and each slave node 30 are provided with transmission drivers 13 and 33, respectively. Each of the drivers 13 and 33 transmits a dominant signal when the communication line 2 is connected to a grounding line.

The transmission driver 13 provided in the master node 10 includes a transistor 14, a resistor 18 and a diode 22. The transistor 14 connects the communication line 2 to the grounding line. The resistor 18 inputs a drive signal from the communication circuit 20 to the base of the transistor 14 to turn on the transistor 14. The diode 22 is provided between the emitter of the transistor 14 and the grounding line.

The diode 22 is provided such that, when the transistor 14 is in a turned-on state, current will flow from the transistor 14 to the grounding line in the forward direction.

Figure 2:
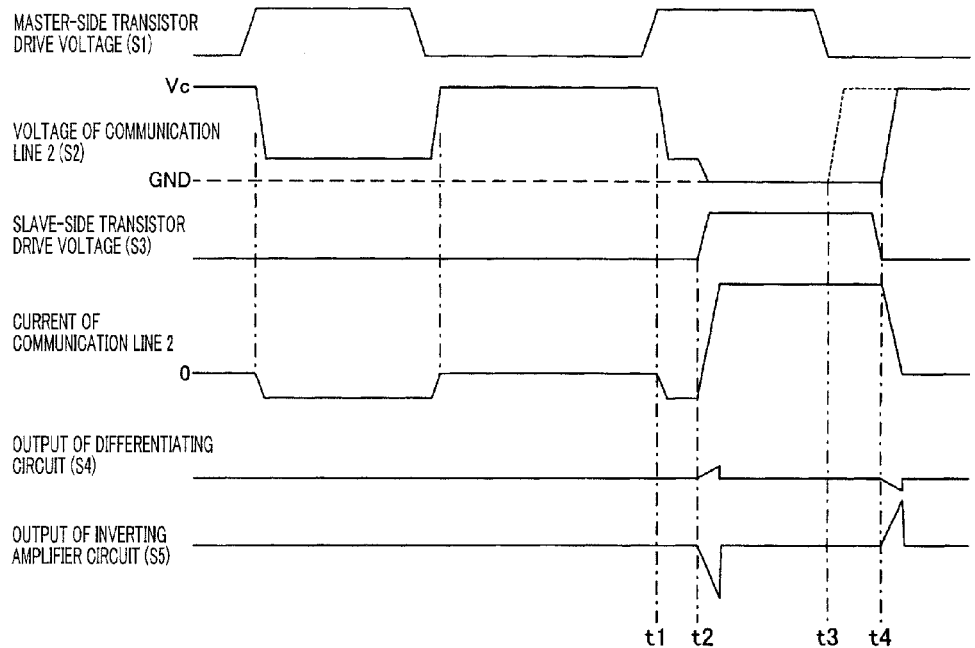
FIG. 2 is a timing diagram illustrating an operation of the communication system.

FIG. 2 is a timing diagram illustrating an operation of the communication system of the present embodiment. As shown in FIG. 2, when the transistor 14 is turned on by a drive voltage S1 applied from the communication line 20, a voltage as a dominant signal is applied to the communication line 2. This voltage as a dominant signal is higher than the ground potential by the amount corresponding to a forward voltage Vf (about 0.7 V) of the diode 22.

Accordingly, the voltage applied to the communication line 2 from the master node 10 in the transmission of a dominant signal varies from the voltage (power-supply voltage Vc) applied to the communication line 2 from the master node 10 in the absence of transmission of a dominant signal. This voltage variation is expressed by "Vc−Vf".

On the other hand, the transmission driver 33 provided in the slave node 30 includes a transistor 34, a resistor 38 and a resistor 42. The transistor 34 connects the communication line 2 to the grounding line. The resistor 38 inputs a drive signal from the communication circuit 40 to the base of the transistor 34 to turn on the transistor 34. The resistor 42 is provided between the emitter of the transistor 34 and the grounding line.

The resistor 42 is used for detecting current flowing to the communication line 2 via the transistor 34. In this case, the current is detected on the basis of the voltage across the resistor 42 (specifically, the voltage at the connecting point between the resistor 42 and the transistor 34). The detected signal (voltage) is inputted to a differentiating circuit 44.

The differentiating circuit 44 differentiates the detected voltage of current derived from the resistor 42 to generate a signal S4. The signal S4 has a larger voltage as the current variation per unit time becomes larger. The generated signal S4 is inputted to an inverting amplifier circuit 46.

The inverting amplifier circuit 46 inverts and amplifies the signal S4 from the differentiating circuit 44 to generate a signal S5. The signal S5 is outputted to the base of the transistor 34 via a capacitor 48.

In this way, the current flowing to the communication line 2 via the transistor 34 is controlled by the operation of the differentiating circuit 44 and the inverting amplifier circuit 46 so that the current variation per unit time will become smaller.

Further, as shown in FIG. 2, the voltage applied to the communication line 2 from the slave node 30 in transmitting a dominant signal will have a potential which is almost the same as the ground potential. Accordingly, although there is a voltage variation from the state where no dominant signal is transmitted, the voltage will substantially be stable in the power-supply voltage Vc.

Therefore, when a dominant signal from the master node 10 collides with a dominant signal from the slave node 30, the potential in the communication line 2 on the master node 10 side becomes higher than the potential on the slave node 30 side. Accordingly, current will flow from the master node 10 to the slave node 30 via the driver 33 of the slave node 30.

When the communication circuit 20 of the master node 10 stops driving the transistor 14 (in other words, stops transmission of a dominant signal) (time t3) while the driver 33 of the slave node 30 draws current from the communication line 2, the potential in the communication line 2 on the master node 10 side may increase as indicated by the dotted line in FIG. 2. However, the current flowing through the communication line 2 will not drastically vary.

Thus, the communication system of the present embodiment can suppress generation of radiation noise due to the current variation in the communication line 2, under the condition that the dominant signals from the master node 10 and the slave node 30 collide with each other on the communication line 2 and the master node 10 thereafter stops transmission of a dominant signal.

In the present embodiment, the driver 13 provided in the master node 10 corresponds to a first driver, and the driver 33 provided in the slave node 30 corresponds to a second driver.

An embodiment of the present invention has so far been described. However, the present invention is not limited to the foregoing embodiment but may be implemented in various modes within a scope not departing from the spirit of the present invention.

First Modification

For example, in the foregoing embodiment, the driver 33 provided in the slave node 30 detects current flowing to the communication line 2 via the resistor 42, and the detected signal (voltage) is then differentiated and inversely amplified. Thus, the transistor 34 is feedback-controlled so that the variation per unit time of the current flowing through the communication line 2 will be smaller.

Figure 3:
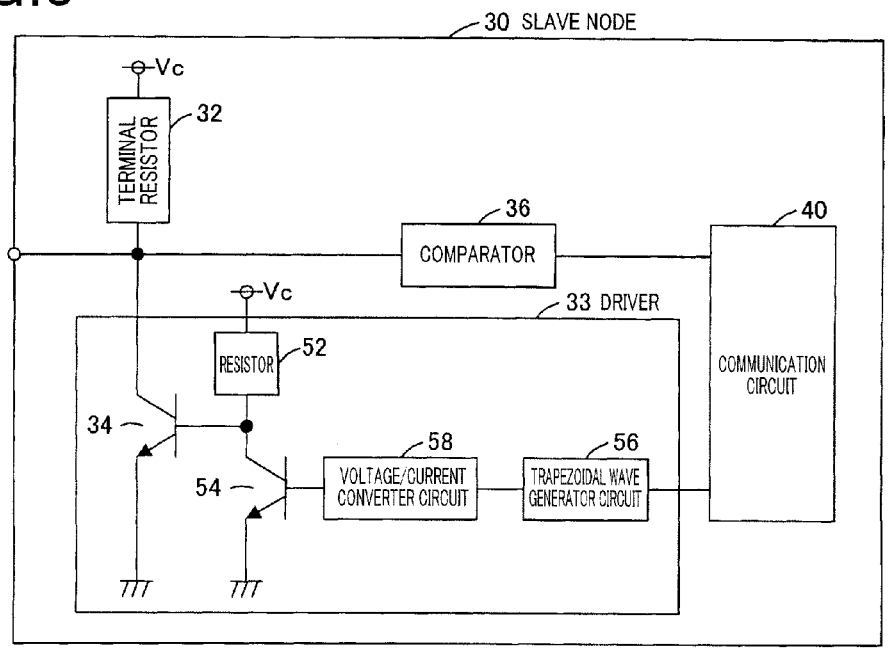
FIG. 3 is a block diagram illustrating a modification of a slave node of the embodiment.

However, the driver 33 provided in the slave node 30 only has to suppress the variation per unit time of the current flowing through the communication line 2 to an extent that radiation noise will not be generated. FIG. 3 is a block diagram illustrating a modification of the slave node 30 of the foregoing embodiment. As shown in FIG. 3, the current flowing to the transistor 34 may be directly controlled.

Specifically, the driver 33 shown in FIG. 3 includes a trapezoidal wave generator circuit 56 and a voltage/current converter circuit 58. The trapezoidal wave generator circuit 56 converts a drive signal (voltage) outputted from the communication circuit 40 into a trapezoidal wave with gentle rising and falling edges. The voltage/current converter circuit 58 applies the drive voltage from the trapezoidal wave generator circuit 56 to the base of a transistor 54 to convert the drive voltage in the trapezoidal waveform into current.

The transistor 54 has an emitter that is grounded and a collector that is connected to the power-supply line via a resistor 52. A connecting point, through which the transistor 54 is connected to the power-supply line, is connected to the base of the transistor 34 for transmitting a dominant signal. Further, similar to the conventional system shown in FIG. 7, the emitter of the transistor 34 is directly connected to the grounding line.

As a result, in transmitting a dominant signal, the transistor 34 varies the current flowing to the communication line 2 in accordance with the waveform of the drive voltage from the trapezoidal wave generator circuit 56. Thus, when the master node 10 stops transmitting a dominant signal, the current flowing through the communication line 2 is prevented from steeply varying.

Accordingly, the driver 33 of the slave node 30 configured as shown in FIG. 3 also can prevent generation of radiation noise in the communication line 2 when the current flowing through the communication line 2 has steeply varied.

Second Modification

In the foregoing embodiment, the master node 10 and the slave node 30 are provided with the communication circuits 20 and 40, respectively, similar to the ones used in the conventional system shown in FIG. 7.

Thus, in the foregoing embodiment, the communication circuit of the slave node 30 switches between transmission and non-transmission of a dominant signal in synchronization with the dominant signal transmitted from the master node 10 to thereby transmit data to the master node 10.

However, the present invention may be applied to a master-slave type communication system based on a communication method which is different from that of the foregoing embodiment. Alternatively, the present invention may be applied to a communication system based on CSMA method (e.g., CSMA/CD method) in which each of a plurality of communication units connected to a communication bus confirms an empty state of the bus by carrier sensing and then performs data communication at optional timing.

Figure 4:
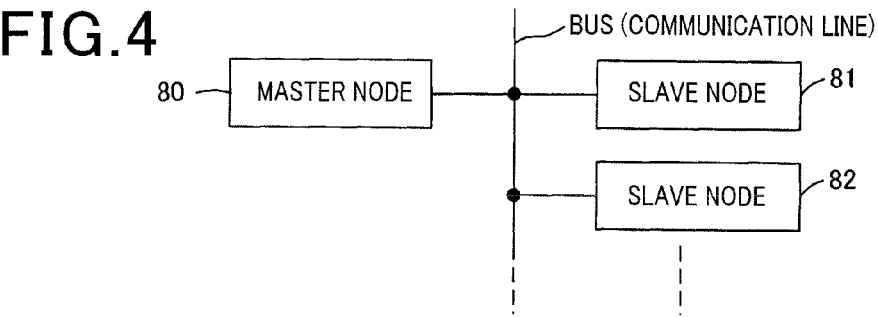
FIG. 4 is a diagram illustrating a modification of the communication system.
Figure 4:
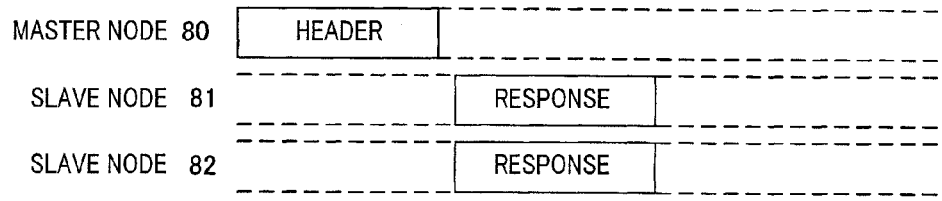

The master-slave type communication system (for vehicles in particular) based on a communication method different from that of the foregoing embodiment may, for example, be a communication system based on LIN (local interconnect network) method as shown in FIG. 4.

Specifically, in the communication system shown in FIG. 4, a single master node 80 and a plurality of slave nodes 81, 82, . . . are connected to a communication bus. The master node 80 transmits a header formed of an identifier and the like. Then, the slave nodes 81, 82, . . . having data to be transmitted transmit a response that includes transmission data.

In the communication system of this type as well, the master node 80 may be provided with the driver 13 having a function of the first driver, and the slave nodes, 81, 82, . . . may each be provided with the driver 33 having a function of the second driver. In this way, advantageous effects similar to those of the foregoing embodiment can be obtained.

Third Modification

In the foregoing embodiment, the master node 10 is provided with the driver 13 having a function of the first driver, and the slave node 30 is provided with the driver 33 having a function of the second driver.

This is because the master node 10 has a higher frequency of transmitting a dominant signal than that of the slave node 30.

Specifically, a communication unit having a higher frequency of transmitting a dominant signal will also have a higher probability of stopping transmission of a dominant signal under the condition that dominant signals collide with each other. Therefore, a communication unit having a higher frequency of transmitting a dominant signal may better be permitted to function as the first driver, and the remaining communication units may each better be permitted to function as the second driver. In this way, the advantageous effects of the present invention may be more effectively exerted.

In some communication systems (e.g., communication systems based on CSMA method mentioned above), there is no distinction between a master node and a slave node. In such a communication system, a communication unit having the highest frequency of transmitting a dominant signal may be provided with the driver 13 having a function of the first driver, while the remaining communication units may each be provided with the driver 33 having a function of the second driver.

Fourth Modification

Figure 5:
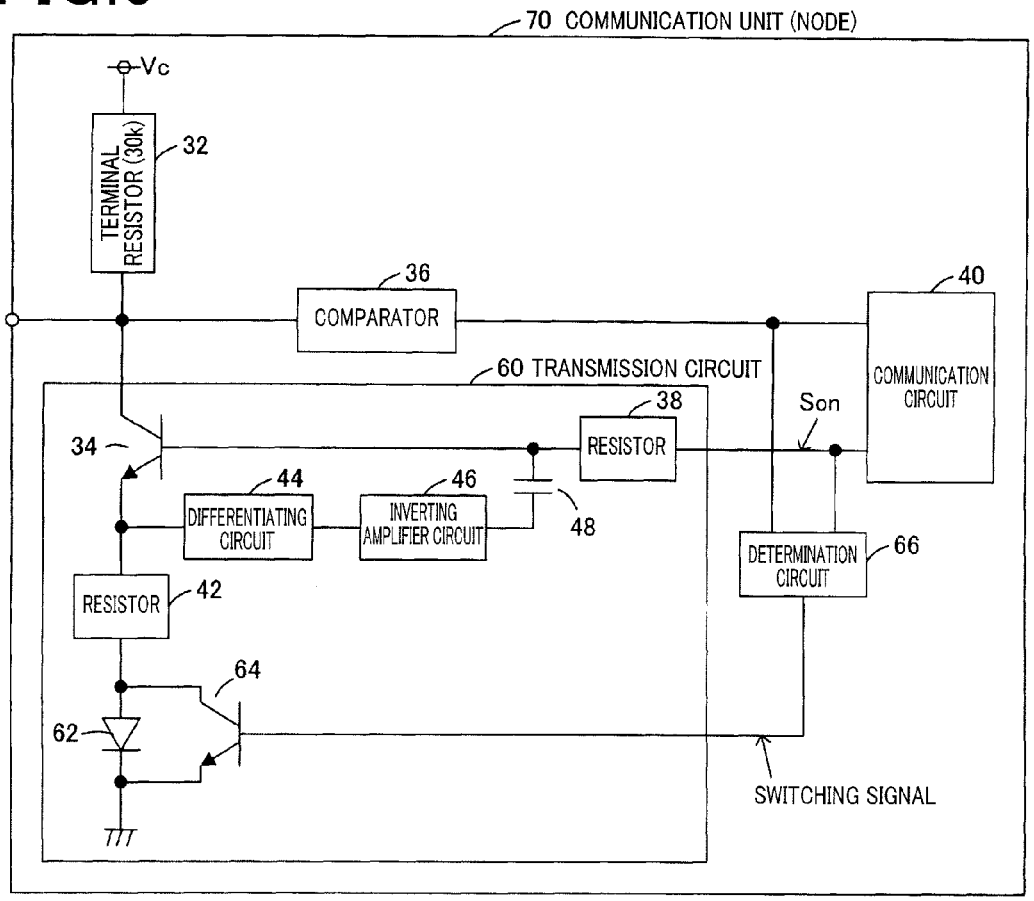
FIG. 5 is a block diagram illustrating an example of a configuration of a communication unit which can realize a node having two types of functions.

Whether the communication system is of a master-slave type or is based on CSMA method, the communication system may be configured as shown in FIG. 5. FIG. 5 is a block diagram illustrating an example of a configuration of a communication unit (node) 70 which can realize a node having two types of functions. Specifically, as shown in FIG. 5, each communication unit (node) 70 may be provided with a transmission circuit 60 having functions of both the first and second drivers.

In this case, each communication unit (node) 70 may be provided with a determination circuit 66 that determines in transmitting a dominant signal, whether a dominant signal is transmitted from a different communication unit.

If a dominant signal is transmitted from a different communication unit, the determination circuit 66 may allow the transmission circuit 60 to function as the second driver (driver 33 of the foregoing embodiment). If a dominant signal is not transmitted from a different communication unit, the determination circuit 66 may allow the transmission circuit 60 to function as the first driver (driver 13 of the foregoing embodiment).

The transmission circuit 60 may be obtained by providing a diode 62 and a transistor 64 to a driver having a configuration similar to the driver 33 shown in FIG. 1.

Specifically, in the transmission circuit 60, the diode 62 may be provided between the resistor 42 for current detection and the grounding line. Thus, the potential applied to the communication line 2 when the transistor 34 is in a turned-on state is increased to a potential which is higher than the ground potential by a predetermined voltage Vf.

Further, in the transmission circuit 60, the transistor 64 may be activated in accordance with a switching signal outputted from the determination circuit 66 to determine whether to form a current path that bypasses the diode 62.

Figure 6:
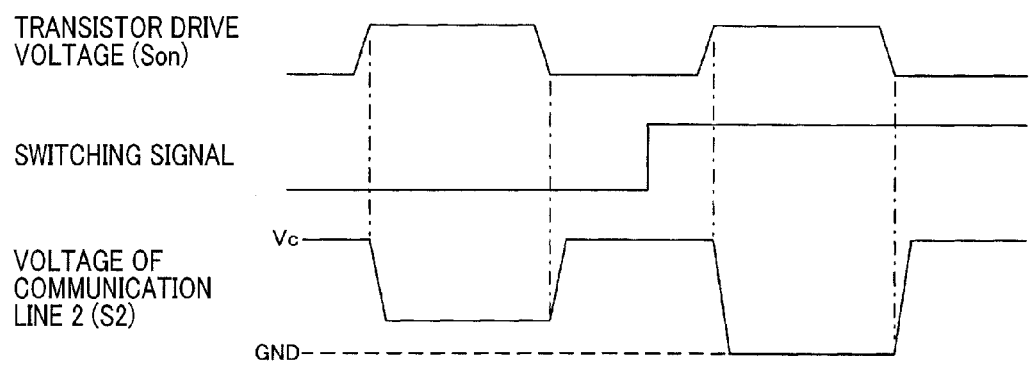
FIG. 6 is a timing diagram illustrating an operation for switching the functions of the communication unit illustrated in FIG. 5.

FIG. 6 is a timing diagram illustrating an operation for switching the functions of the communication unit (node) 70. As shown in FIG. 6, a drive voltage Son (high level) is outputted from the communication circuit 40 to turn on the transistor 34. In this case, if the output from the comparator 36 is at a high level, the determination circuit 66 may output a switching signal at a low level. On the other hand, if the output from the comparator 36 is at a low level, the determination circuit 66 may output a switching signal at a high level.

According to this configuration, when the communication unit 70 transmits a dominant signal earlier than other communication units, the output to the communication line 2 is made larger than the ground potential by the amount corresponding to the forward voltage Vf of the diode 62. Thus, the transmission circuit 60 can function as the first driver.

Further, if a different communication unit has already transmitted a dominant signal by the time when the communication unit 70 transmits a dominant signal, the output to the communication line 2 is made equal to the ground potential. Thus, the transmission circuit 60 can function as the second driver.

Fifth Modification

In the foregoing embodiment, each of the plurality of communication units (nodes) configuring the communication system is ensured to transmit a dominant signal by switching the potential of the communication line 2 from a high level (power-supply voltage Vc) to a low level (ground potential or forward voltage Vf of the diode).

However, the present invention may be applied to a communication system in which each of a plurality of communication units (nodes) configuring the communication system is ensured to transmit a dominant signal by switching the potential of the communication line 2 from a low level (ground potential) to a high level (power-supply voltage Vc or "Vc−Vf").

Sixth Modification

In the foregoing embodiment, the voltage for the master node 10 when outputting a dominant signal is set to a value different from that of the voltage for the slave node 30 to output a dominant signal. In setting the value in the foregoing embodiment, the forward voltage Vf of the diode 22 is used. Alternatively, in setting the value, a constant voltage source different from the diode 22 may be used.

Hereinafter, aspects of the above-described embodiments will be summarized.

In the communication system, at least one of the communication units (10) includes a first driver (13) which is set so that a variation of voltage applied to the communication line in transmission of the dominant signal with respect to that in absence of transmission of the dominant signal is smaller than a variation of voltage applied from another of the communication units to the communication line in transmission of the dominant signal.

Accordingly, when a dominant signal from the communication unit having the first driver collides with a dominant signal from a different communication unit on the communication line, the above difference in the voltage variation range causes a potential difference between the ends of the communication line (specifically, portions of the communication line, to which the respective communication units are connected). Accordingly, current will unidirectionally flow through the communication line from a high potential end to a low potential end.

In addition, another of the communication units (30), which differs from the communication unit including the first driver, includes a second driver (33) which limits variation per unit time of current flowing through the communication line in transmission of the dominant signal.

Specifically, when the communication unit having the first driver stops transmission of a dominant signal in a state where dominant signals collide with each other on the communication line, the current flowing through the communication line will vary. In this case, however, the current variation can be limited, as mentioned above, by the different communication unit having the second driver.

In this way, the communication system of the present invention is able to smooth the variation of the current flowing through the communication line to thereby suppress generation of radiation noise.

It will be appreciated that the present invention is not limited to the configurations described above, but any and all modifications, variations or equivalents, which may occur to those who are skilled in the art, should be considered to fall within the scope of the present invention.

What is claimed is:

1. A communication system, comprising:
a plurality of communication units connected to a communication line, in which collisions occur between dominant signals outputted from the communication units on the communication line, wherein
at least one of the communication units includes a first driver which is set so that a variation of voltage applied to the communication line in transmission of the dominant signal with respect to that in absence of transmission of the dominant signal is smaller than a variation of voltage applied from another of the communication units to the communication line in transmission of the dominant signal, and
one of the communication units, which differs from the communication unit including the first driver, includes a second driver which limits variation per unit time of current flowing through the communication line in transmission of the dominant signal,
the communication unit including the first driver outputs the dominant signal to the communication line before the communication units different from the communication unit including the first driver output the dominant signal,
each of the plurality of communication units includes a transmission circuit which has functions of the first driver and the second driver, and a switching unit which determines in transmitting the dominant signal, whether a dominant signal is transmitted from another of the communication units,
if the dominant signal is not transmitted from the another of the communication units, the switching unit allows the transmission circuit to function as the first driver,
if the dominant signal is transmitted from the another of the communication units, the switching unit allows the transmission circuit to function as the second driver,
the transmission circuit is provided with a diode and a transistor,
the diode makes a potential, which is applied to the communication line, higher than a ground potential by a predetermined voltage,
the transistor is activated in accordance with a switching signal outputted from the switching unit to determine whether to form a current path that bypasses the diode,
when one of the plurality of communication units transmits a dominant signal earlier than the others of the plurality of communication units, the switching unit makes an output to the communication line larger than the ground potential by the amount corresponding to a forward voltage of the diode to make the transmission circuit function as the first driver, and
if another of the communication units has already transmitted a dominant signal by a time when the one of the plurality of communication units transmits a dominant signal, the switching unit makes the output to the communication line equal to the ground potential to make the transmission circuit function as the second driver.

2. The communication system according to claim 1, wherein
the plurality of communication units include a master node and at least one slave node, and
the first driver is provided in the master node, and the second driver is provided in the slave node.

3. The communication system according to claim 2, wherein
the master node periodically transmits the dominant signal, and
the slave node switches between transmission and non-transmission of a dominant signal thereof in synchronization with the dominant signal from the master node, to transmit data.

4. The communication system according to claim 1, wherein
the first driver is provided in one of the communication units, which has a higher frequency of transmitting the dominant signal, and
the second driver is provided in another of the communication units, in which the first driver is not provided.

5. The communication system according to claim 1, wherein
signals transmitted by the communication units vary between only a first voltage level and a second voltage level different from the first voltage level.

6. The communication system according to claim 1, wherein
the second driver further includes
a differentiator configured to differentiate a detected voltage based on a current from the communication line to generate a differentiated voltage, and
an inverting amplifier configured to invert the differentiated voltage.

* * * * *